United States Patent Office 2,899,400
Patented Aug. 11, 1959

2,899,400

COMPOSITION COMPRISING STYRENE POLYMER, WAX AND MOLYBDENUM DISULFIDE AND PHONOGRAPH RECORD MOLDED THEREFROM

Paul H. Lipke, Jr., Midland, and Maurice J. Gifford, Freeland, Mich., assignors to The Dow Chemical Company, Midland, Mich., a corporation of Delaware No Drawing. Application October 18, 1955
Serial No. 541,290

9 Claims. (Cl. 260—28.5)

This invention relates to phonograph record compositions and has particular reference to molding compositions prepared from alkenyl aromatic resins which are well adapted to being formed into high quality phonograph records having extraordinary replay endurance and wear resisting characteristics.

Polymers and copolymers of styrene, methyl (ar) styrene or vinyl toluene and like alkenyl aromatic compounds have been employed in molding compositions for forming phonograph records. Record discs prepared from such materials, however, ordinarily have only a limited endurance and display poor wear resisting characteristics when they are subjected to repeated playbacks. Usually this is primarily due to their being easily abraded by the phonograph needle or stylus (attached to the pickup arm of a record player) in its tracting operation while following the grooves in the record. Even when wax or wax-like materials are included in such compositions to lower their coefficients of friction, they produce phonograph records which tend to have poorer wear resisting characteristics than is desirable.

It is among the principal objects of the present invention to provide thermoplastic compositions which can readily be molded into phonograph records having superior endurance characteristics and which are capable of rendering sound reproductions having excellent fidelity to accurately reproduce orginally recorded transcriptions even after many repeated playbacks of the record. Other objects and advantages will hereinafter be apparent.

According to the present invention, compositions adapted to being formed into high quality, wear resisting phonograph records are comprised of a thermoplastic alkenyl aromatic resin containing a compatible quantity of a wax lubricating material and between about 0.1 and 10 percent by weight of molybdenum disulfide. Advantageously, the compositions may be made containing between about 0.25 and 3.0 and, more advantageously, about 1.0 percent by weight of the molybdenum disulfide. The compositions may readily be prepared according to conventional compounding techniques into a form suitable for molding. For example, pre-blended, formulated materials may be compounded and extruded into pellets or granules for a subsequent molding operation or into rods which may be ground into a molding powder. Or, if desired, milling techniques may be employed. The compounded compositions may be molded according to any desired procedure, including compression and injection molding, into high quality phonograph records having excellent wear resisting characteristics.

The molybdenum disulfide which is incorporated in the molding compositions of the present invention provides substantially better groove lubrication in any type of phonograph record to permit passage of the needle with lower attendant friction than when wax compounds alone are employed for this purpose. If desired, a dispersion of molybdenum disulfide in aliphatic hydrocarbon oils, alcohols, water or in other dispersing vehicles may be employed for formulating the compositions. Advantageously a smooth textured molybdenum disulfide material which is chemically stable and capable of being employed at temperature up to about 750° F. may be utilized. Such a material is available under the tradename "Molykote G" from the Alpha Corporation.

The alkenyl aromatic resins which are employed may be thermoplastic polymers which contain at least about 50 percent by weight of at least one alkenyl aromatic compound having the general formula $Ar\text{---}CR\text{=}CH_2$ wherein Ar is an aromatic radical and R is selected from the group consisting of a hydrogen atom and a methyl radical. Thermoplastic, moldable polymers and copolymers of styrene, methyl (ar) styrene or vinyltoluene, mono- and di-chlorostyrene and dimethyl styrene may be advantageously utilized. Polystyrene and polyvinyltoluene are preferably employed in the compositions.

The wax lubricating materials which may be employed in the compositions of the present invention include a variety of natural and synthetic waxes and wax-like materials. Such natural waxes as carnauba, candelilla, montan, esparto, ouricury, beeswax, cotton wax, Chinese wax, Japan wax, myrtle wax, paraffin wax, microcrystalline wax, ozokerite, ceresin and the like may be utilized. Synthetic waxes may also be advantageously employed such as the octadecanamide series of light colored synthetic waxes which are similar to those available under the trade-name "Acrawax C" from the Glyco Products Co., Inc.

Generally the compatible quantity of wax lubricating material having a beneficial lubricating effect on the composition is in excess of about 1, and frequently between about 2 and 5 percent by weight. The precise amounts, however, usually vary with the particular wax lubricating material and polymer being compounded. The following table indicates the compatibility levels of two of the wax lubricating materials with various polymers which may be employed in compositions according to the present invention.

| Polymer of— | Compatible Percent by Weight Of— | |
|---|---|---|
| | Carnauba Wax | "Acrawax C" |
| Styrene | 2–4 | 2 |
| Vinyltoluene | 6–8 | 3–5 |
| 3,5 Dichlorostyrene | 4–6 | 6–8 |
| Dimethyl styrene | 16 | 8 |

It is usually advantageous to employ an amount of the wax lubricating material which is as great as possible within the compatibility levels of the particular polymer being employed. Amounts of wax lubricant in excess of that which is compatible may also be employed without detracting from the improved groove lubricating benefits obtainable for phonograph records by employing molybdenum disulfide in accordance with the present invention.

As an illustrative example, a phonograph record molding composition was prepared from polyvinyltoluene containing about 5 percent by weight of "Acrawax C" by dry blending the ingredients at room temperature in a ribbon blender, then extruding them into a solid rod which was ground to a formulated molding powder. The formulated powder was injection molded into a standard 33⅓ r.p.m. phonograph record which was impressed with a sound track bearing both a high frequency tone of about 6,000 cycles per second and a low frequency tone of about 60 cycles per second. This permitted a standard intermodulation distortion test to be conducted on the record after any desired number of playbacks to measure the relatively increased distortion of the originally transcribed frequencies due to record wear. Such a test is similar to that described in such reference works as Varanek's "Acoustic Measurements"; Frayne and Wolfe's "Sound Recording"; and Oliver Read's "Recording and Reproducing Sound, 2nd ed." The initial intermodulation distortion of the freshly pressed record was 6 percent. After only 25 playbacks it had risen to 20 percent.

In comparison, a phonograph record made in the same manner from a composition comprised of polyvinyltoluene containing about 5 percent by weight of "Acrawax C" and about 1 percent by weight of molybdenum disulfide had an initial intermodulation distortion of 7 percent which only slightly increased to 9 percent after 125 playbacks. Similar results are obtainable with microgroove and standard phonograph records prepared from both compositions which are played at speeds of 45 and 78 r.p.m.

In an analogous manner, the wear resisting characteristics of polystyrene phonograph record compositions are enhanced when about 1 percent by weight of molybdenum disulfide is included in the composition.

The molybdenum disulfide molding compositions of the present invention, in the absence of other coloring matter, are usually opaque and have a steel grey coloration. If desired, such conventional coloring matter for phonograph records as carbon black and non-abrasive pigments may be added to the molybdenum disulfide modified compositions of the present invention for the purpose of obtaining any color which may be wanted in the record. In addition, as much as 75 percent by weight of such fillers as barytes, diatomaceous silica, whiting and the like may also be employed in the compositions. Their use, however, may not be desirable in as great a proportion when it is intended to injection mold the compositions into phonograph records. Better results are usually obtained in such instances when the amount of filler which is employed is not permitted to exceed about 25 or 30 percent by weight.

The compositions of the present invention are capable of being satisfactorily injection molded with high-speed automatic equipment. They set up quickly enough for this purpose when they are molded and can be released from the mold in a clean and efficient manner without any occurrence of sticking. This increases their desirability as phonograph record compositions since many phonograph records are manufactured with high-speed, automatic injection molding equipment.

Since certain changes and modifications can readily be entered into in the practice of the present invention without substantially departing from its spirit and scope, it is to be fully understood tdat all the foregoing be interpreted as being merely illustrative of certain of the possible embodiments of the invention.

What is claimed is:
1. Composition for molding phonograph records comprising a thermoplastic alkenyl aromatic resin containing a quantity of a wax lubricating material in an amount between about 1 and about 16 percent by weight that is compatible with said resin, and between 0.1 and 10 percent by weight of molybdenum disulfide, said alkenyl aromatic resin containing at least about 50 weight percent of at least one alkenyl aromatic compound of the formula: $Ar-CR=CH_2$, wherein Ar is an aromatic radical having a hydrocarbon ring and R is selected from the group consisting of hydrogen and methyl.

2. The composition of claim 1 wherein the thermoplastic alkenyl aromatic resin is polystyrene.

3. The composition of claim 1 wherein the thermoplastic alkenyl aromatic resin is polyvinyltoluene.

4. The composition of claim 1 wherein the thermoplastic alkenyl aromatic resin is a polymer of a chlorostyrene containing not more than two ring substituent chlorine atoms per each recurring styrene group in the polymer molecule.

5. The composition of claim 1 wherein the thermoplastic alkenyl aromatic resin is a polymer of dimethyl styrene.

6. The composition of claim 1 containing between about 0.25 and 3.0 percent by weight of molybdenum disulfide.

7. Compositions for molding phonograph records comprising a thermoplastic alkenyl resin containing a compatible quantity not in excess of between about 1 and 5 percent by weight of a wax lubricating compound and between about 0.25 and 3.0 percent by weight of molybdenum disulfide, said alkenyl aromatic resin containing at least about 50 weight percent of at least one alkenyl aromatic compound of the formula: $Ar-CR=CH_2$, wherein Ar is an aromatic radical having a hydrocarbon ring and R is selected from the group consisting of hydrogen and methyl.

8. Composition for molding phonograph records comprising polyvinyltoluene containing about 5 percent by weight of a wax lubricating material consisting essentially of octadecanamide and about 1 percent by weight of molybdenum disulfide.

9. A phonograph record molded from the composition set forth in claim 7.

References Cited in the file of this patent
UNITED STATES PATENTS

| | | |
|---|---|---|
| 2,644,804 | Rubin | July 7, 1953 |
| 2,670,308 | Groff et al. | Feb. 23, 1954 |
| 2,686,155 | Willis et al. | Aug. 10, 1954 |

FOREIGN PATENTS

| | | |
|---|---|---|
| 654,533 | Great Britain | June 20, 1951 |

OTHER REFERENCES

"The Chemistry and Technology of Waxes" (Worth), published by Reinhold (New York), 1947, pages 283–284.